(12) United States Patent
Shoeb et al.

(10) Patent No.: US 12,400,350 B2
(45) Date of Patent: Aug. 26, 2025

(54) DETECTION OF CLOSE ENCOUNTERS WITH OBSTACLES BY AERIAL VEHICLES

(71) Applicant: WING Aviation LLC, Mountain View, CA (US)

(72) Inventors: Ali Shoeb, San Rafael, CA (US); Domitille Commun, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 466 days.

(21) Appl. No.: 17/990,193

(22) Filed: Nov. 18, 2022

(65) Prior Publication Data

US 2024/0169573 A1 May 23, 2024

(51) Int. Cl.
| | | |
|---|---|---|
| *G06T 7/593* | (2017.01) | |
| *B64C 39/02* | (2023.01) | |
| *B64U 20/87* | (2023.01) | |
| *G06T 7/11* | (2017.01) | |
| *G06T 7/136* | (2017.01) | |
| *G06T 7/155* | (2017.01) | |
| *G06T 7/246* | (2017.01) | |
| *B64U 101/31* | (2023.01) | |

(52) U.S. Cl.
CPC ............ *G06T 7/593* (2017.01); *B64C 39/024* (2013.01); *B64U 20/87* (2023.01); *G06T 7/11* (2017.01); *G06T 7/136* (2017.01); *G06T 7/155* (2017.01); *G06T 7/248* (2017.01); *B64U 2101/31* (2023.01); *G06T 2207/10021* (2013.01); *G06T 2207/10032* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 2010/0305857 | A1* | 12/2010 | Byrne | ............. G06T 7/73 382/107 |
| 2019/0087635 | A1* | 3/2019 | Klaus | ............. H04N 13/239 |

(Continued)

OTHER PUBLICATIONS

Park et al., Collision avoidance for quadrotor using stereo vision depth maps, in IEEE Transactions on Aerospace and Electronic Systems, vol. 51, No. 4, pp. 3226-3241, Oct. 2015, doi: 10.1109/TAES.2015.140222.*

(Continued)

*Primary Examiner* — Guillermo M Rivera-Martinez
(74) *Attorney, Agent, or Firm* — Christensen O'Connor Johnson Kindness PLLC (57) ABSTRACT

Techniques for identifying a close encounter between an aircraft and an obstacle are disclosed. The technique includes acquiring a video stream of a ground area below the aircraft with a stereovision camera system disposed onboard the aircraft. A depth perception map is generated with a stereovision processing pipeline indicating stereovision depth estimates of first image pixels from the video stream. An optical flow map is generated with an optical flow processing pipeline indicating optical flow depth estimates of second image pixels from the video stream. The depth perception and optical flow maps are compared. An encounter flag indicating that the close encounter between the aircraft and the obstacle occurred is asserted based at least on the comparing.

20 Claims, 10 Drawing Sheets

(56) References Cited

U.S. PATENT DOCUMENTS

| | | | |
|---|---|---|---|
| 2019/0138029 A1* | 5/2019 | Ryll | G06T 7/73 |
| 2019/0385361 A1* | 12/2019 | Siddiqui | G06T 7/579 |
| 2022/0121836 A1 | 4/2022 | Dins et al. | |
| 2023/0316939 A1* | 10/2023 | Elhossini | G06T 7/11 |

OTHER PUBLICATIONS

Urieva et al., 2020 International Conference on Unmanned Aircraft Systems (ICUAS), Athens, Greece. September 1-4, 2020, pp. 607-614, doi: 10.1109/ICUAS48674.2020.9213957.*

McGuire et al., Efficient Optical Flow and Stereo Vision for Velocity Estimation and Obstacle Avoidance on an Autonomous Pocket Drone, in IEEE Robotics and Automation Letters, vol. 2, No. 2, pp. 1070-1076, Apr. 2017, doi: 10.1109/LRA.2017.2658940.*

Pęszoret al., Fast Moving UAV Collision Avoidance Using Optical Flow and Stereovision, In: Nguyen, N., Tojo, S., Nguyen, L., Trawinski, B. (eds) Intelligent Information and Database Systems, ACIIDS 2017. Lecture Notes in Computer Science, vol 10192, pp. 872-581,doi.org/10.1007/978-3-319-54430-4_55.*

Joon Yeop Lee et al., "UAV Flight and Landing Guidance System for Emergency Situations", Sensors 2019, vol. 19, No. 20, Oct. 15, 2019, p. 4468, ISSN: 1424-8220, DOI: 10.3390/s19204468, 21 pages.

PCT International Partial Search Report mailed Feb. 16, 2024, in corresponding International Application No. PCT/US2023/035235, 9 pages.

PCT International Search Report and Written Opinion mailed Apr. 8, 2024, in corresponding International Application No. PCT/US2023/035235, 18 pages.

Tchernykh et al., Optical Flow Navigation for an Outdoor UAV Using a Wide Angle Mono Camera and Dem Matching, IFAC Proceedings vol. 39, No. 16, 2006, 6 pages.

Deris et al., Depth Cameras on UAVs: A First Approach, The International Archives of Photogrammetry, Remote Sensing and Spatial Information Sciences 42, 2017, 7 pages.

Gageik et al., An Autonomous UAV with an Optical Flow Sensor for Positioning and Navigation, International Journal of Advanced Robotic Systems, vol. 10, 2013, 9 pages.

Elements of Computer Vision, https://cs.standard.edu/people.eroberts/courses/soco/projects/1997-98/computer-vision/motion.html, downloaded from Internet on Sep. 29, 2022, 2 pages.

Collins, Lecture 22: Camera Motion, CSE486, Penn State, Lecture Notes 2005, 9 pages.

Carrio et al., Onboard Detection and Localization of Drones Using Depth Maps, IEEE Access vol. 8, Feb. 5, 2020, 11 pages.

O'Donovan, Optical Flow: Techniques and Applications, International Journal of Computer Vision, Apr. 6, 2005, 26 pages.

Optical Flow, Wikipedia Article, https://en.wikipedia.org/w/index.php?title=Optical_flow&oldid=1107945655, Sep. 1, 2022, 6 pages.

* cited by examiner

DETECTION OF CLOSE ENCOUNTERS WITH OBSTACLES BY AERIAL VEHICLES

TECHNICAL FIELD

This disclosure relates generally to obstacle avoidance by aircraft, and in particular but not exclusively, relates to detection of close encounters with ground-based obstacles by unmanned aerial vehicles using visual perception techniques.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression), the UAV should be capable of identifying and avoiding ground-based obstacles.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for identifying a close encounter between an aircraft and an obstacle are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide visual perception techniques for identifying close encounters between an aircraft, such as unmanned aerial vehicles (UAVs), and obstacles, such as ground-objects rising from the ground. These techniques use optical flow image analysis to identify close encounters and issue close encounter flags. In various embodiments, optical flow image analysis is supplemented by parallel processing of conventional stereovision depth perception and/or semantic analysis (e.g., image/semantic segmentation also referred to as object detection) to provide improved reliability, noise immunity, and faster obstacle identification. When close encounter flags are asserted, a variety of responsive actions may be taken. For example, close encounter flags may trigger one or more of immediate course corrections, issuance of a warning to a backend management system, or saving a temporal window of the video stream (e.g., video clip) surrounding the encounter for subsequent image analysis. The warning may be issued wirelessly (e.g., over cellular networks) to a backend management system, which in turn may establish a geofence restriction zone around the global positioning system (GPS) location of the close encounter as an immediate safety measure for other UAV missions until the close encounter can be more closely analyzed. High quality video clips (e.g., high resolution and full frame rate) of the close encounter may also be saved for subsequent analysis via three-dimensional (3D) model reconstruction software. The 3D model reconstruction may be performed to determine whether existing 3D models need to be revised.

3D model reconstruction is a compute intensive activity. Accurate identification of close encounters reduces incidence of wasting compute resources on analyzing false positive encounters. Since 3D model reconstructions may not be feasible in real-time, encounter flags can trigger storage of high-quality video clips of the encounters. These video clips can then be analyzed when compute and power resources are available. For example, a UAV 105 may use onboard compute resources to perform 3D model reconstructions on the video clips in the background as the mission unfolds (assuming adequate compute and power resources are available). Otherwise, UAV 105 may wait to analyze video clips upon return to its local nest and while onboard processing resources are otherwise underutilized and/or UAV 105 is charging for its next mission. This option has the advantage of deploying the available, and otherwise wasted, distributed compute resource of a charging fleet for productive means. Onboard processing of the video clips also frees the backend management system of this task. This beneficially preserves valuable bandwidth between the deployed fleet and a cloud-based backend management system. Of course, in yet other embodiments, the video clips may still be uploaded to the backend management system upon return of the UAVs to their nest.

Identification of close encounters also enables event-driven 3D model reconstruction of specific geographic areas. Accurate identification of close encounters helps target the aerial images required to perform 3D model reconstruction. In addition to being compute intensive, 3D model reconstruction consumes valuable storage capacity for the aerial images used during the 3D model reconstruction. Intelligent and accurate identification of those geographic areas most likely to need 3D model reconstruction to add or modify an obstacle in the 3D model, helps limit memory resources dedicated to short-term storage of these large aerial image files, which need to be stored until 3D model reconstruction is performed.

Figure 1:
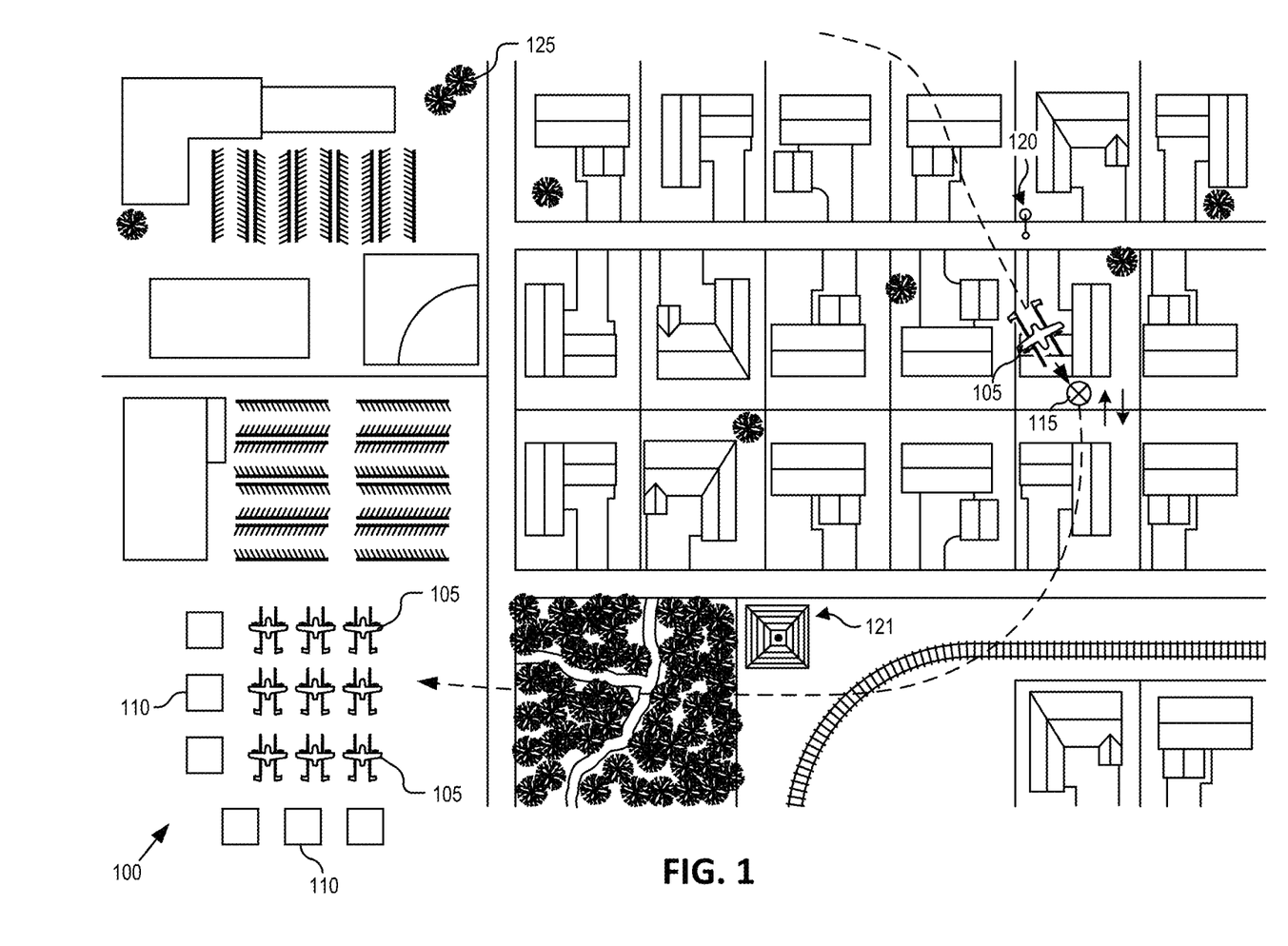
FIG. 1 illustrates operation of unmanned aerial vehicles (UAVs) in the presence of ground-based obstacles to provide an aerial delivery service to a neighborhood, in accordance with an embodiment of the disclosure.

FIG. 1 is a plan view illustration of a terminal area 100 for staging UAVs 105 that deliver packages to a neighborhood, in accordance with an embodiment of the disclosure. UAVs may one day routinely deliver small items into urban or suburban neighborhoods from small regional or neighborhood hubs such as terminal area 100 (also referred to as a local nest). Vendor facilities 110 may setup adjacent to terminal area 100 to take advantage of the aerial delivery service. A typical aerial delivery mission may include loading a UAV 105 with a package from a vendor facility 110 at terminal area 100, where it ascends to a cruise altitude enroute to a customer destination 115. At destination 115, UAV 105 descends for package drop-off before once again ascending to a cruise altitude for the return journey back to terminal area 100.

During the course of a delivery mission, ground-based obstacles may be an ever-present hazard—particularly tall slender obstacles such as streetlights 120, telephone poles, radio towers 121, cranes, trees 125, etc. Some of these obstacles may be persistent unchanging obstacles (e.g., streetlights, telephone poles, radio towers, etc.) while others may be temporary (cranes, etc.), or always changing (e.g., trees). Regardless, identification and avoidance of these obstacles is important for safe UAV navigation. These ground-based obstacles may be tall enough to present a hazard during cruise flight segments enroute to-and-fro destination 115 or present an acute hazard when descending to, or ascending from, destination 115. Accordingly, embodiments described herein use visual based perception techniques to quickly identify close encounters of unexpected obstacles, record these close encounters for subsequent analysis, report these close encounters for the immediate safety of other UAV missions, or potentially take real-time remedial actions for the safety of the UAV that first identifies of obstacle.

Figure 2:
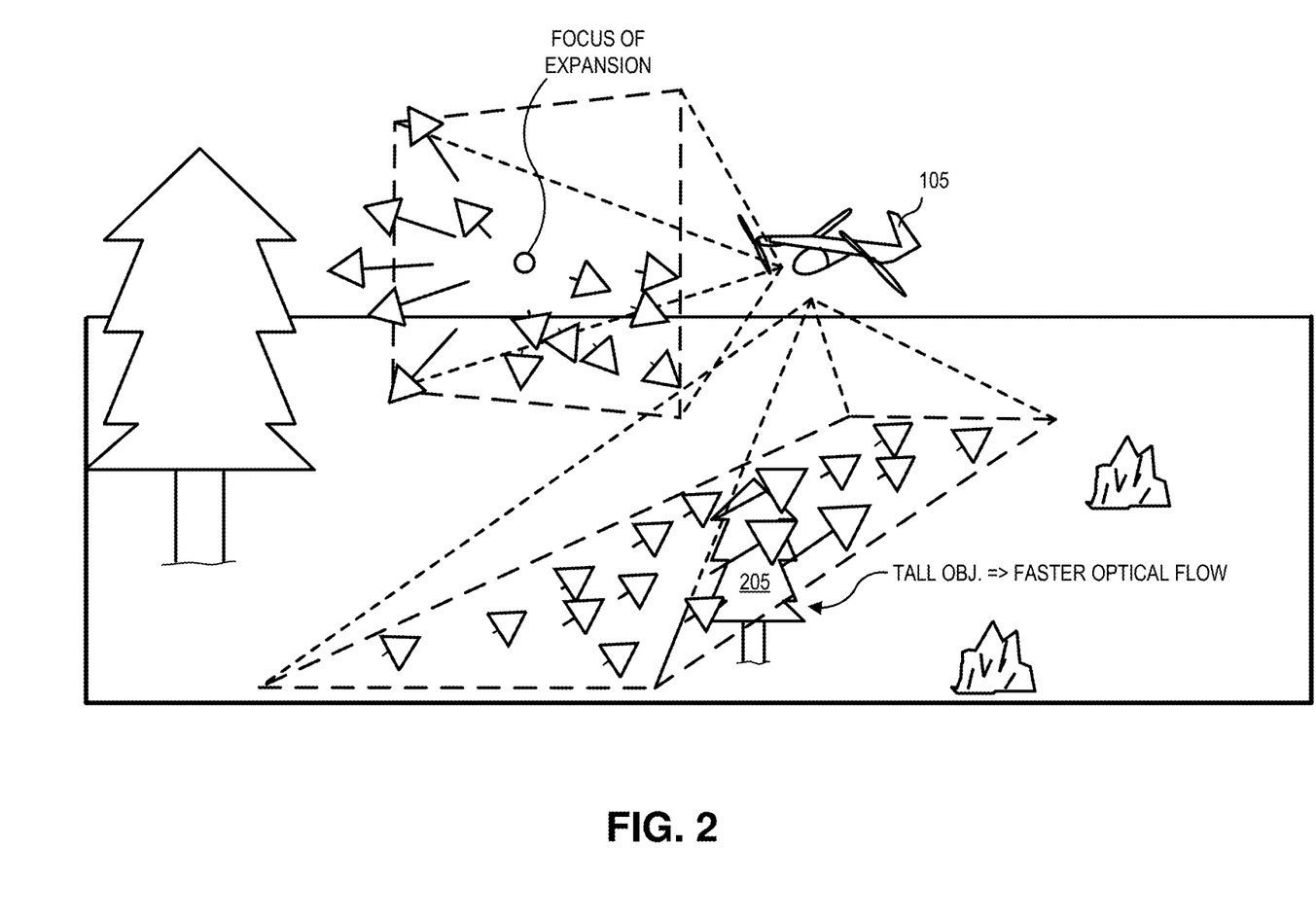
FIG. 2 illustrates optical flow-based analysis to identify close encounters with obstacles, in accordance with an embodiment of the disclosure.

FIG. 2 illustrates optical flow-based analysis to identify close encounters between UAV 105 and obstacle 205, in accordance with an embodiment of the disclosure. Optical flow is the pattern of motion of image pixels representing objects, surfaces, edges, etc. in a visual scene due to relative motion between the observer (e.g., onboard camera system) and a scene (e.g., ground area below UAV 105). Optical flow is the distribution of apparent velocities, or flow velocities, of the image pixels between consecutive image frames in a video stream (e.g., sequence of image frames). Objects in the image, or image pixels, that appear to move more quickly are estimated to be closer or have a shallower image depth than image pixels that move more slowly. The divergence of these flow velocities can be used to compute a "focus of expansion," which indicates a direction of heading for UAV 105, a gradient in flow velocities across an object can be used to estimate its height, and the absolute flow velocity of an image pixel can be used to estimate its image depth in the scene (i.e., distance between object and camera). Accordingly, an onboard camera system of UAV 105 that is oriented to look down at the ground below the UAV can be leveraged to estimate distances to objects captured in the images to thereby flag close encounters. In embodiments where the onboard camera system is a stereovision camera system, the optical flow analysis can be supplemented with conventional depth perception that leverages parallax to estimate object distances. Finally, semantic analysis that leverages object detection and additional knowledge graphs based upon GPS location can further be used to mask encounter flags, reducing false positives, and providing faster and more accurate obstacle detection.

Figure 3A:
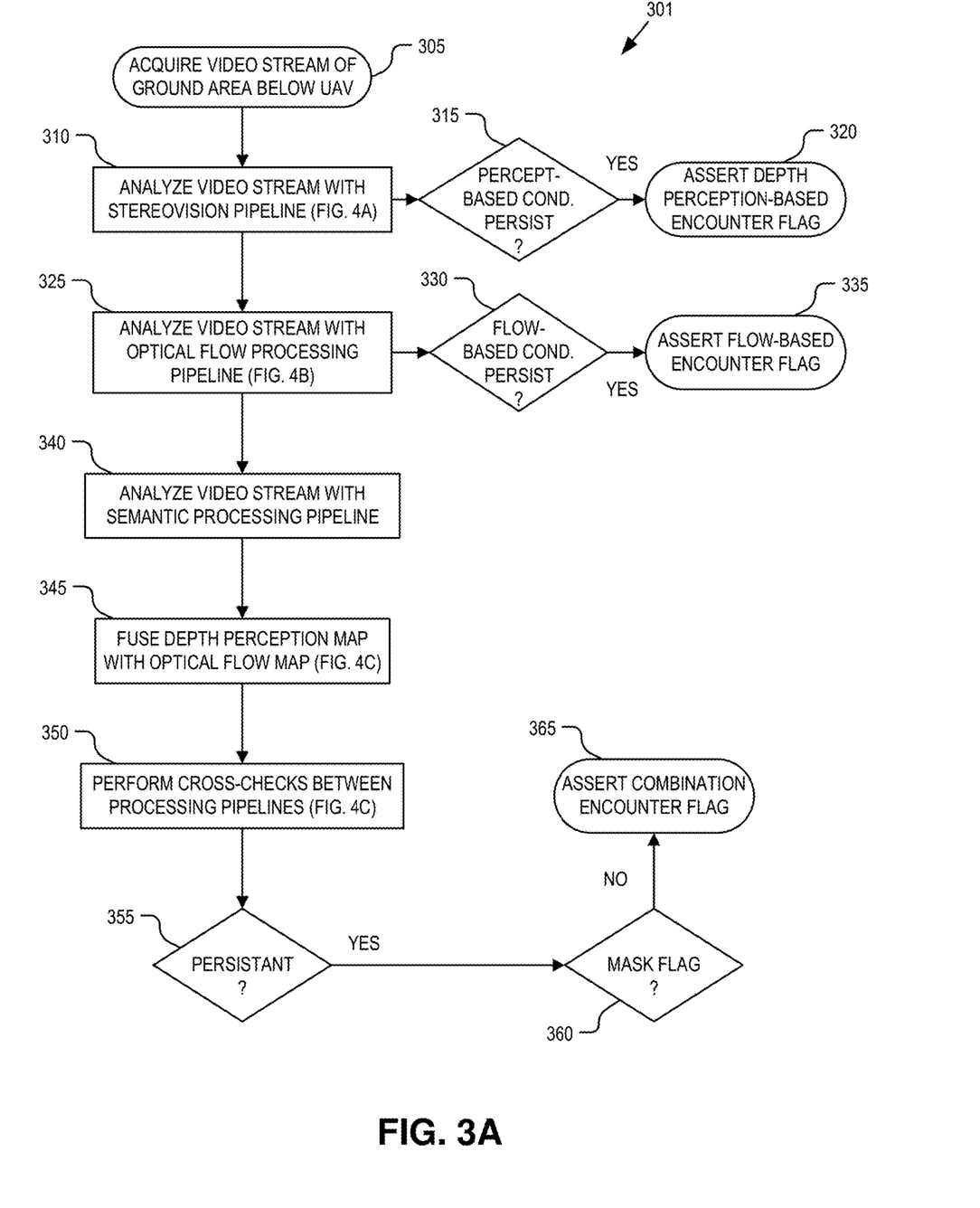
FIG. 3A is a flow chart illustrating a process of identifying close encounters with ground-based obstacles using visual perception techniques, in accordance with an embodiment of the disclosure.
Figure 4A:
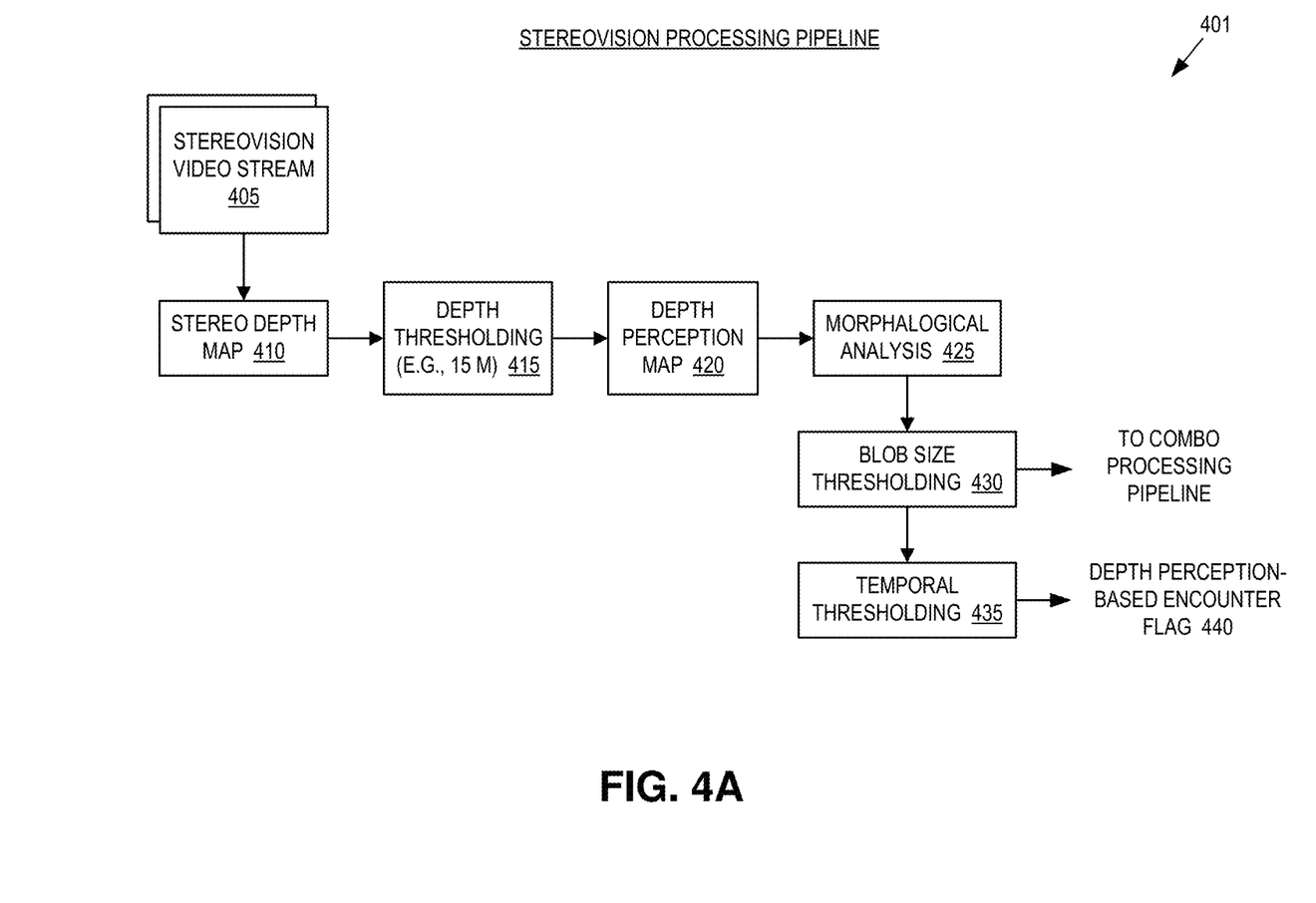
FIG. 4A is a dataflow diagram illustrating a stereovision processing pipeline for visually identifying a close encounter, in accordance with an embodiment of the disclosure.
Figure 4B:
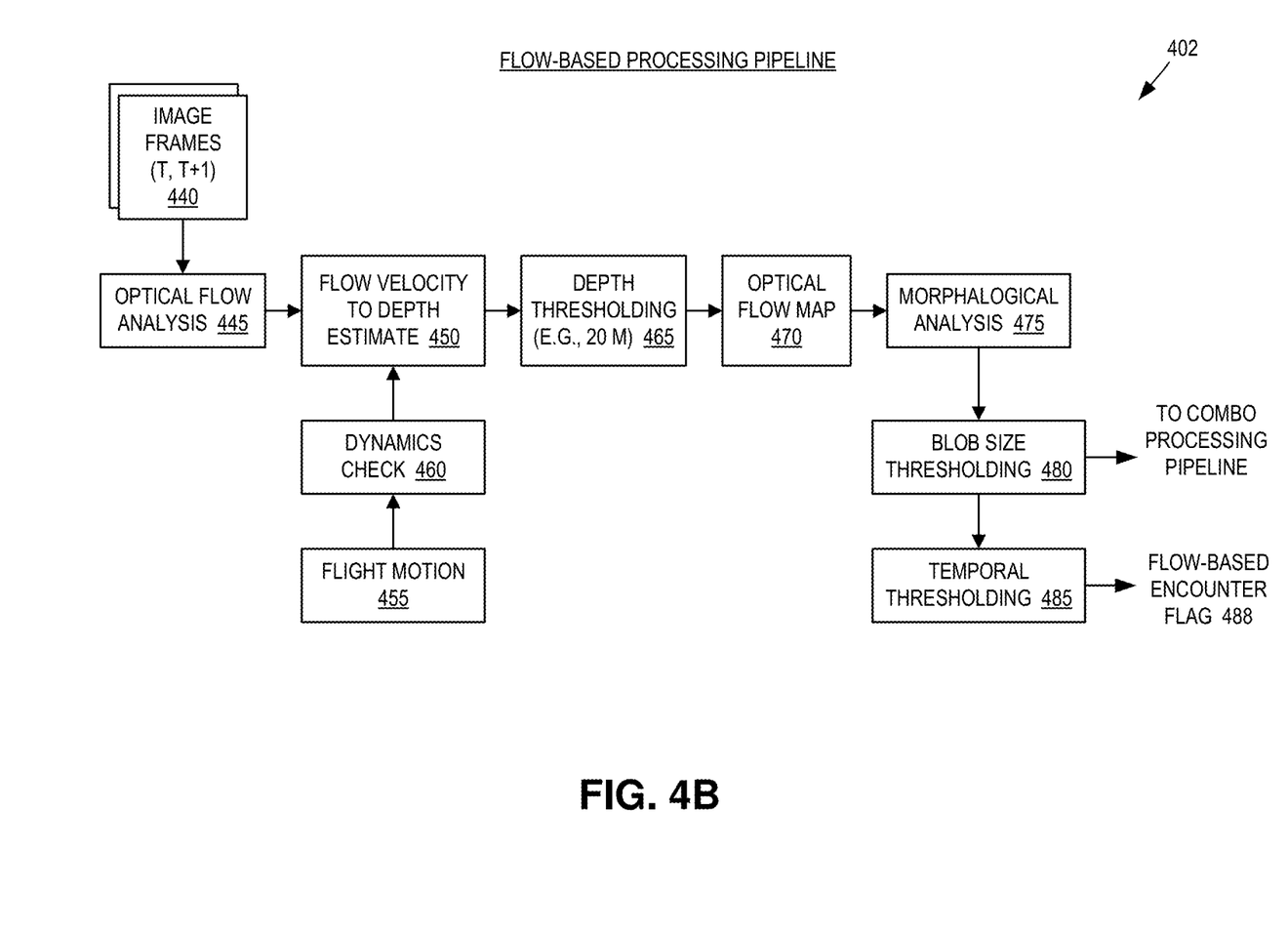
FIG. 4B is a dataflow diagram illustrating a flow-based processing pipeline for visually identifying a close encounter, in accordance with an embodiment of the disclosure.
Figure 4C:
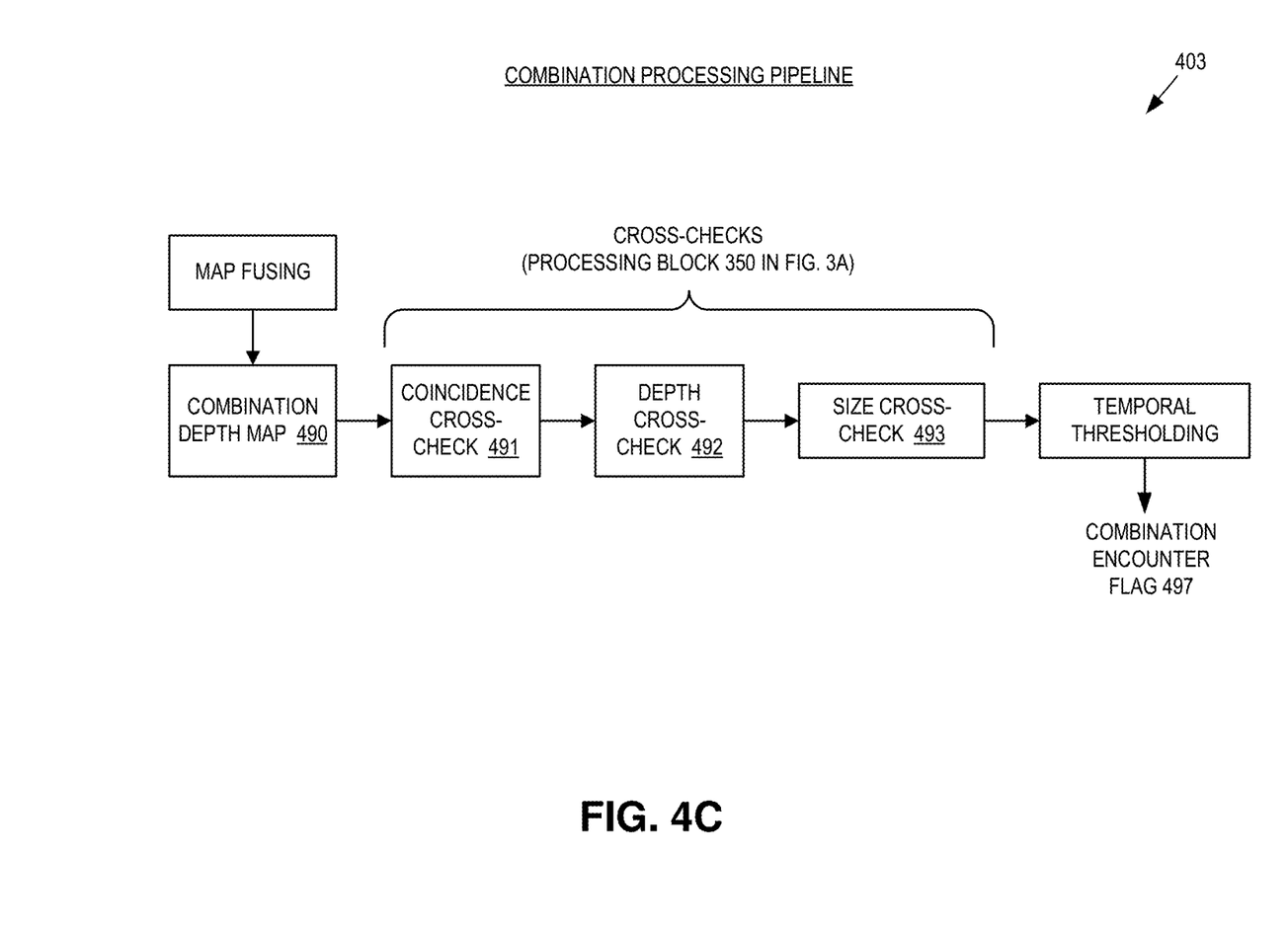
FIG. 4C is a dataflow diagram illustrating a combination processing pipeline for visually identifying a close encounter, in accordance with an embodiment of the disclosure.

FIG. 3A is a flow chart illustrating a process 301 for identifying close encounters with ground-based obstacles using visual perception techniques, in accordance with an embodiment of the disclosure. Process 301 is described with reference to FIGS. 4A-C and 5A-D. FIG. 4A is a dataflow diagram illustrating a stereovision processing pipeline 401 executing depth perception analysis by an onboard processing system of UAVs 105. FIG. 4B is a dataflow diagram illustrating an optical flow processing pipeline 402 executing optical flow analysis by the onboard processing system of UAVs 105. FIG. 4C is a dataflow diagram illustrating a combination processing pipeline 403 executed by the onboard processing system of UAVs 105 to provide faster, more reliable identification of close encounters based upon both the stereovision and optical flow processing pipelines. The order in which some or all of the process blocks appear in process 301 should not be deemed limiting. Rather, one of ordinary skill in the art having the benefit of the present disclosure will understand that some of the process blocks may be executed in a variety of orders not illustrated, or even in parallel.

In a process block 305, a video stream of a ground area below a UAV 105 is acquired with its onboard camera system. In one embodiment, the onboard camera system is a stereovision camera system capable of capturing binocular sub-streams. The term "video stream" is used herein broadly to generically refer to image data, which may include one or two monovision sub-streams acquired from a monovision or a stereovision camera system, respectively. The video streams may include image frames acquired in regular intervals (e.g., 30 frames per second, etc.). The video stream is buffered in onboard memory of UAV 105. The buffer duration, or temporal window, may include 15 sec, 30 sec, or any duration of video frames adequate to fully capture video of a close encounter and implement image processing and analysis of the obstacle for 3D model reconstruction. In some embodiments, the length of the temporal window and/or frame rate of the close encounter video clip that is stored for subsequent processing (e.g., 3D model reconstruction) may be keyed to the UAV's speed over ground. For example, higher frame and shorter temporal windows may be used for high-speed encounters while lower frame rate and longer temporal windows may be used for low speed encounters.

In a processing block 310, the video stream is analyzed by stereovision processing pipeline 401 (see FIG. 4A) to identify depth perception-based conditions indicative of a close encounter with an object. Close encounters, as determined by stereovision processing pipeline 401, include objects estimated to come within a threshold distance (e.g., 15 m). When the depth perception-based conditions persist for a threshold period of time (decision block 315), a depth perception-based encounter flag 440 is asserted (processing block 320).

Figure 5A:
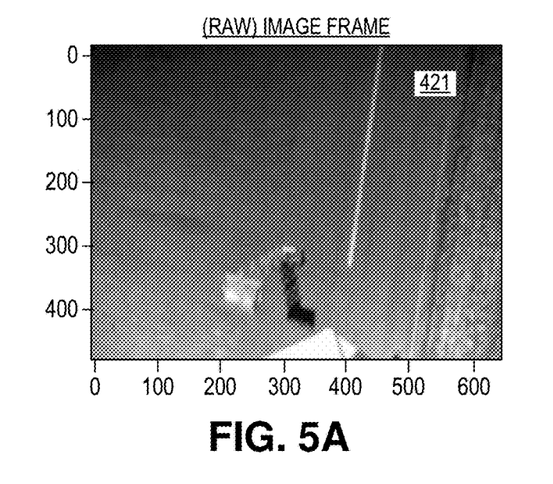
FIG. 5A illustrates an image frame from a camera system onboard the UAV, in accordance with an embodiment of the disclosure.
Figure 5B:
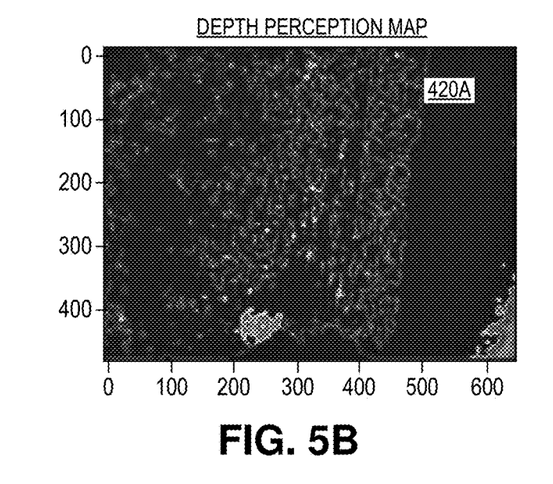
FIG. 5B illustrates an example depth perception map, in accordance with an embodiment of the disclosure.

FIG. 4A illustrates the dataflow of stereovision processing pipeline 401. At block 405 a stereovision video stream is acquired by the onboard camera system of UAV 105 and outputs a stereo depth map 410 by analyzing displacements in image pixels between the monovision sub-streams. These displacements/offsets are due to parallax, which in turn correlates to visual depth or distance from the stereovision camera system to the object. Commercially available stereovision camera systems are readily available and output versions of stereo depth map 410. Stereo depth map 410 is then depth thresholded (e.g., 15 m threshold) to generate depth perception map 420, which includes all image pixels estimated to fall within the threshold depth. Depth perception map 420 may represent a sort of heat map of the scene below UAV 105 with closers objects represented in "hotter" colors. FIG. 5B illustrates an example depth perception map 420A corresponding to image frame 421 in FIG. 5A. FIG. 5A is an image frame 421 captured of a crane on the ground under UAV 105. Depth perception map 420 is then morphologically analyzed at block 425. Morphological analysis includes image filters to eliminate noise and other anomalies that don't move or change over time in a manner inconsistent with a ground-based scenery captured from an aircraft. The morphological analysis may be executed using image segmentation (i.e., object detection) to identify and track contiguous pixel groups (also referred to as "pixel blobs") representing discrete objects in the video stream. Machine learning (ML) models may also be used to perform the morphological analysis. The contiguous pixel groups, or pixel blobs, are then size thresholded to further eliminate anomalies or inconsequential pixel groups (block 430). Size thresholding may include minimum contiguous pixel counts, minimum area calculations, or otherwise. Finally, the pixel blobs are temporally thresholded (block 435). Accordingly, depth perception-based conditions indicating a close encounter may include: (1) the persistence of pixel blobs having (2) a minimum threshold size falling within (3) a threshold depth for (4) a threshold period of time. When the depth perception-based conditions are satisfied, depth perception-based encounter flag 440 is asserted.

Returning to FIG. 3A, in a processing block 325, the video stream is analyzed by flow-based processing pipeline 402 (see FIG. 4B) to identify flow-based conditions indicative of a close encounter with an object. Close encounters, as determined by flow-based processing pipeline 402, include objects estimated to come within another threshold distance (e.g., 20 m). When the flow-based conditions persist for a threshold period of time (decision block 330), a flow-based encounter flag 488 is asserted (processing block 335).

FIG. 4B illustrates the dataflow of flow-based processing pipeline 402. At block 440 consecutive image frames of the video stream (e.g., a monovision sub-stream from the stereovision camera system) are acquired by the onboard camera system of UAV 105 and analyzed at block 445 using optical flow image analysis techniques. These optical flow image analysis techniques at block 445 may include conventional optical flow analysis, ML optical flow analysis, a combination thereof, or otherwise to determine the flow velocities of image pixels moving between consecutive image frames at time T and T+1. For example, the flow velocities may include counts of the number of pixels a given image pixel moved between consecutive frames along with a direction (e.g., pixel direction vectors).

However, flow velocities of image pixels may occur due to both translational movement of UAV 105 and rotational movement of UAV 105. The flow velocity component due to translational camera movement includes depth information, while the flow velocity components due to rotational motion do not and thus should be eliminated or offset. Equations 1 and 2 below detail the x and y flow velocity components:

$$v_x = \frac{T_z x - T_x f}{Z} - \left[\omega_y f + \omega_z y + \frac{\omega_x xy}{f} - \frac{\omega_y x^2}{f}\right], \quad \text{(Eq. 1)}$$

$$v_y = \frac{T_z y - T_y f}{Z} + \left[\omega_x f + \omega_z x + \frac{\omega_y xy}{f} + \frac{\omega_x y^2}{f}\right], \quad \text{(Eq. 2)}$$

where $v_x$ and $v_y$ represent x and y components of a 3D flow velocity; $T_x$, $T_y$, and $T_z$ represent linear velocities; $\omega_x$, $\omega_y$, and $\omega_z$ represent angular velocities; f represents camera focal length; and Z represents depth (i.e., distance from camera). The first fractional expression over Z in each of Eqs. 1 and 2 represent the translational component of flow velocities while the remaining expressions in square brackets are rotational components that should be eliminated or offset. Accordingly, onboard motion sensors (e.g., GPS sensor, inertial measurement unit, gyroscope, etc.) are used to measure the translational and angular motion of UAV 105 while the video stream is acquired. This flight motion is obtained at block 455 and used to compute depth estimates from the flow velocities at block 450 using Eqs. 1 and 2 by solving for Z. In one embodiment, a dynamics check (block 460) is performed to determine when UAV 105 is flying along a straight path without yaw, roll, or pitch motions. During these straight path flight segments, flow-based processing to compute flow depth estimates is simplified since the rotational components are known to be negligible. Alternatively, the flight motion may be measured and used to offset or compensate for the deleterious rotational components and solve Eqs. 1 and 2 for Z.

Figure 5C:
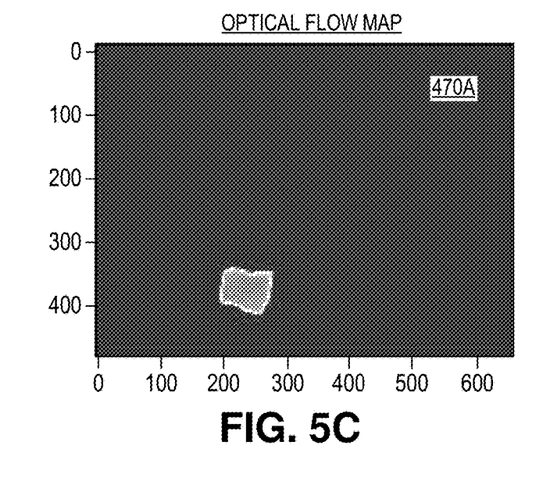
FIG. 5C illustrates an example optical flow map, in accordance with an embodiment of the disclosure.

With the flow-based depth estimates determined, these depth estimates are depth thresholded (e.g., 20 m threshold) at block 465 to generate optical flow map 470, which includes all image pixels estimated to fall within the threshold depth. FIG. 5C illustrates an example optical flow map 470A corresponding to image frame 421 in FIG. 5A. Similar to depth perception map 420, optical flow map 470 may also represent a sort of heat map of the scene below UAV 105 with closer objects represented in "hotter" colors. Optical flow map 470 is then morphologically analyzed at block 475. As before, morphological analysis may include image filters to eliminate noise and other anomalies that don't move, or change over time in a manner inconsistent with ground-based scenery. The morphological analysis may also include image segmentation (i.e., object detection) to identify and track contiguous pixel groups or pixel blobs representing discrete objects in the video stream. The pixel blobs are then size thresholded to further eliminate anomalies or inconsequential pixel groups (block 480). Size thresholding may include minimum contiguous pixel counts, minimum area calculations, or otherwise. Finally, the pixel blobs are temporally thresholded (block 485). Accordingly, flow-based conditions indicative of a close encounter may include: (1) the persistence of pixel blobs having (2) a minimum threshold size falling within (3) a threshold depth for (4) a threshold period of time. When the flow-based conditions are satisfied, flow-based encounter flag 488 is asserted.

Returning to FIG. 3A, in a process block 340, a semantic processing pipeline is optionally executed on the video stream. This semantic processing pipeline may perform semantic segmentation on the raw video stream (e.g., see image frame 421 in FIG. 5A) in an attempt to identify the objects below UAV 105 and apply contextual information from a localized knowledge graph of the geographic area. For example, if the GPS location of the UAV 105 indicates that UAV 105 is over a freeway, and/or object detection recognizes one or more vehicles, then flow-based encounter flags may be ignored or masked (decision block 360) as false positives particularly when depth perception-based encounter flags are not currently asserted. Fast moving cars on a freeway may trigger false flow-based encounter flags. The semantic processing pipeline acquires additional contextual and semantic information from the raw video stream, onboard sensors, map data, 3D models, or otherwise, which may be used to selectively mask encounter flags later in process 301.

Figure 5D:
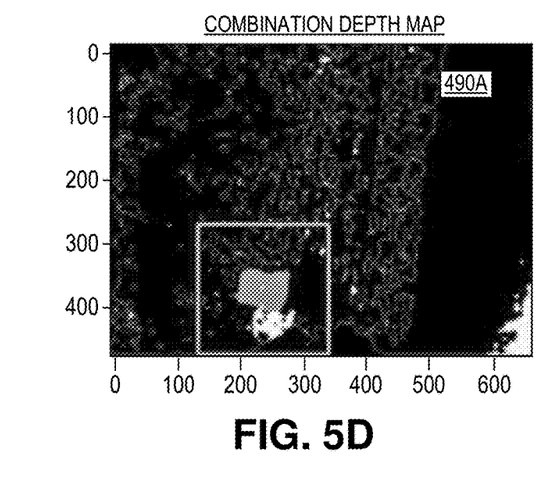
FIG. 5D illustrates an example combination depth map, in accordance with an embodiment of the disclosure.

In a process block 345 (and also referring to FIG. 4C), depth perception map 420 and optical flow map 470 are fused to generate a combination depth map 490 (see FIG. 5D representing an example combination depth map 490A representing the fusion of depth perception map 420A and optical flow map 470A). In a processing block 350, a series of cross-checks between the stereovision and flow-based processing pipelines 401 and 402 is performed. These cross-checks may include a coincidence cross-check 491, a depth cross-check 492, and a size cross-check 493. Coincidence cross-check 491 determines whether contiguous pixel groups, or pixel blobs, from the two processing pipelines are determined to spatially coincide, overlap, or fall within a threshold distance of each other. Depth cross-check 492 determines whether the contiguous pixel groups from the two processing pipelines fall within a common depth range. Size cross-check 493 determines whether the contiguous pixel groups from the two processing pipelines have a common size within a threshold size deviation. When the cross-checks are affirmative and persist for a threshold period (decision block 355), a combination encounter flag 497 may be asserted at processing block 365. Since combination encounter flag 497 is based upon both flow-based and depth perception-based image processing, it may be viewed as a more reliable indicator of a close encounter. As such, the temporal thresholding performed at decision block 355 may be shorter, providing a quicker flag response, than the temporal thresholding performed at decision blocks 315 and 330 individually. However, as mentioned above, a third semantic processing pipeline (not illustrated) may be used to mask the encounter flags, including combination encounter flag 497, at a decision block 360.

Figure 3B:
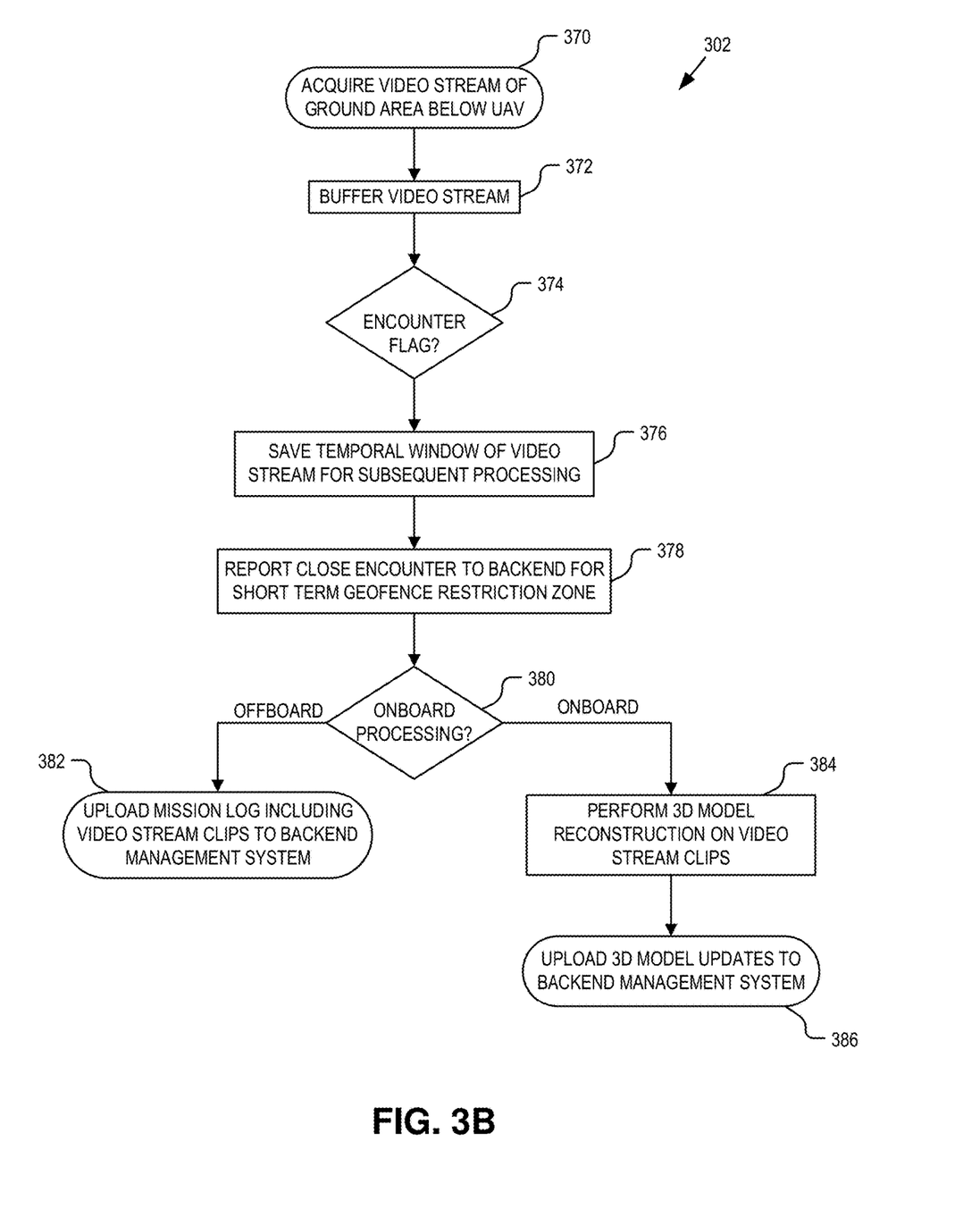
FIG. 3B is a flow chart illustrating a flag response process including actions taken when close encounters between a UAV and an obstacle are flagged, in accordance with an embodiment of the disclosure.

FIG. 3B is a flow chart illustrating a flag response process 302 including actions taken when close encounters between a UAV 105 and an obstacle 205 are flagged, in accordance with an embodiment of the disclosure. The order in which some or all of the process blocks appear in process 302 should not be deemed limiting. Rather, one of ordinary skill in the art having the benefit of the present disclosure will understand that some of the process blocks may be executed in a variety of orders not illustrated, or even in parallel.

In a process block 370, a video stream of the ground is continuously captured by the onboard camera system of UAVs 105. This video stream is continuously buffered during flight (process block 372). When encounter flags are asserted (decision block 374), a temporal window of the buffered video stream is saved to onboard memory of UAV 105 (processing block 376). The temporal window includes a portion of the video stream surrounding assertion of the encounter flag. In one embodiment, video clips may be saved in association with assertion of any one of depth perception-based encounter flag 440, flow-based encounter flag 488, or combination encounter flag 497. In yet another embodiment, video clips are only saved in association with non-masked, combination encounter flags 497. The duration and frame rate of the video clip of the encounter may be fixed (e.g., 15 seconds at full camera frame rate, etc.), or variable depending upon the speed of UAV 105 when the encounter flag was asserted.

Once a close encounter has been identified and flagged, the backend management system may be immediately informed (process block 378). An immediate notification enables the backend management system to immediately establish a geofence restriction zone around the location of the close encounter until the saved video clip of the close encounter is analyzed. The geofence restriction zone can ensure that other UAVs 105 operating in the area don't collide with the obstacle in the interim before the obstacle is 3D mapped and added into the map database.

The saved video clips facilitate subsequent processing of the image data to update 3D models and improve knowledge of the physical environment and its inherent obstacles. However, 3D model reconstruction is compute intensive, power intensive, and time consuming. As such, UAV 105 can elect to offload the processing to a cloud-based backend management system, or keep the video clips onboard for later processing (decision block 380). In the event of offloading the processing, the video clips can be stored until UAV 105 returns to terminal area 100 and uploaded to the backend management system with its mission log while UAV 105 recharges in preparation for the next mission (processing block 382). Alternatively, the image processing may be performed onboard UAV 105 as compute and power resources permit (process block 384). This processing (e.g., 3D model reconstruction) may be executed in the background while in flight and/or performed once UAV 105 has returned to terminal area 100 and is charging. Once image analysis is complete, 3D model updates may be communicated to the backend management system.

Figure 6A:
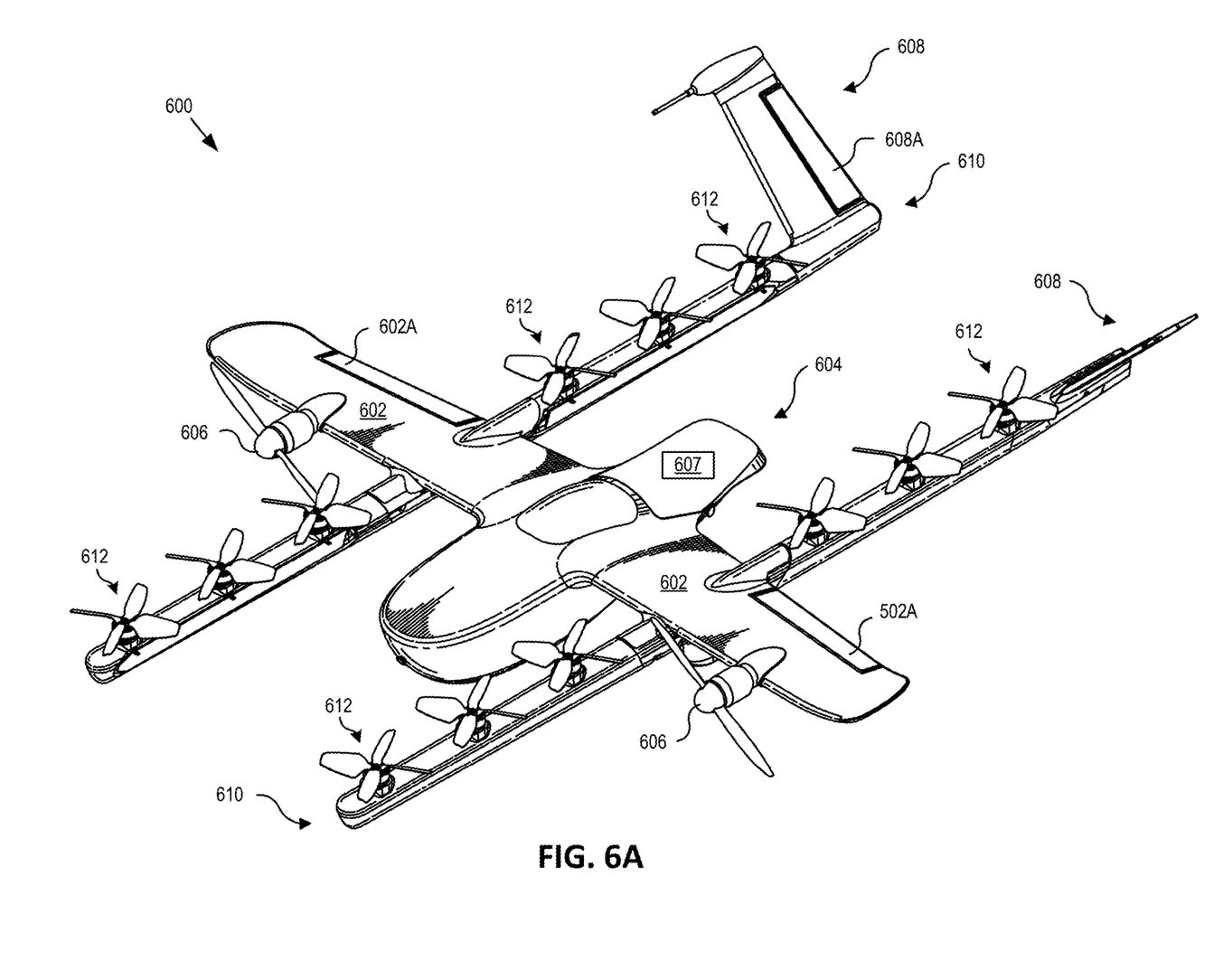
FIG. 6A is a perspective view illustration of a UAV configured for identifying close encounters using visual perception techniques, in accordance with an embodiment of the disclosure.
Figure 6B:
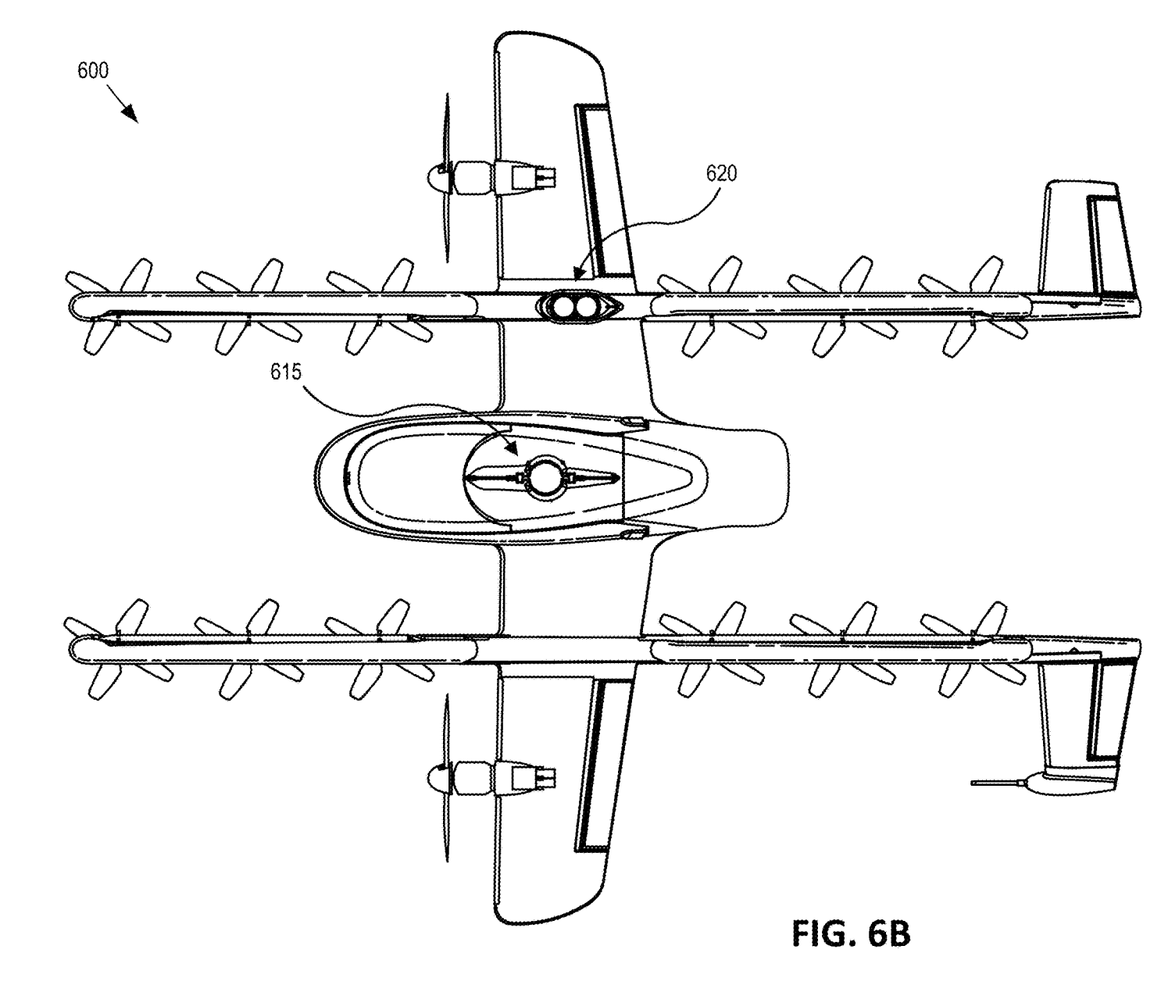
FIG. 6B is an underside plan view illustration of the UAV configured for identifying close encounters using visual perception techniques, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIG. 1, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 6B, an onboard camera 620 is mounted to the underside of UAV 600 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608a for controlling the aerial vehicle's yaw, and wing assembly 602 may include elevators for controlling the aerial vehicle's pitch and/or ailerons 602a for controlling the aerial vehicle's roll. While the techniques described herein are particularly well-suited for VTOLs providing an aerial delivery service, it should be appreciated that analyzing shadow lengths to infer the heights of ground-based obstacles is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of identifying a close encounter between an aircraft and an obstacle, the method comprising:
   acquiring a video stream of a ground area below the aircraft with a stereovision camera system disposed onboard the aircraft;
   generating a depth perception map indicating stereovision depth estimates of first image pixels from the video stream with a stereovision processing pipeline;
   generating an optical flow map indicating optical flow depth estimates of second image pixels from the video stream with an optical flow processing pipeline;
   comparing the depth perception and optical flow maps; and
   asserting an encounter flag indicting that the close encounter between the aircraft and the obstacle occurred based at least on the comparing.

2. The method of claim 1, wherein comparing the depth perception and optical flow maps comprises:
   comparing the depth perception and optical flow maps to identify spatially coincident pixel groups between the first and second image pixels that also fall within a common depth range as determined from the stereovision depth estimates and the optical flow depth estimates.

3. The method of claim 2, wherein the spatially coincident pixel groups comprise contiguous pixels groups in the first and second image pixels having a threshold overlap or fall within a threshold distance of each other.

4. The method of claim 2, wherein comparing the depth perception and optical flow maps further comprises:
   comparing the depth perception and optical flow maps to identify the spatially coincident pixel groups between the first and second image pixels that also have a common size within a threshold size deviation.

5. The method of claim 1, wherein asserting the encounter flag indicting that the close encounter between the aircraft and obstacle occurred comprises:
   asserting the encounter flag after one or more cross-check conditions between the stereovision processing pipeline and the optical flow processing pipeline that are indicative of the close encounter have persisted for a first temporal threshold.

6. The method of claim 5, wherein the encounter flag comprises a combination encounter flag based upon both the stereovision processing pipeline and the optical flow processing pipeline, the method further comprising:

asserting a depth perception-based encounter flag when depth perception-based conditions in the stereovision processing pipeline indicative of the close encounter have persisted for a second temporal threshold;
asserting a flow-based encounter flag when flow-based conditions in the optical flow processing pipeline indicative of the close encounter have persisted for a third temporal threshold,
wherein the first temporal threshold is shorter than the second and third temporal thresholds.

7. The method of claim 1, wherein generating the optical flow map comprises:
   determining flow velocities of the second image pixels by comparing pixel motions of the second image pixels between consecutive image frames in the video stream;
   monitoring a flight motion of the aircraft using one or more onboard motion sensors; and
   calculating the optical flow depth estimates for the second image pixels based on both the flow velocities and the flight motion of the aircraft.

8. The method of claim 7, wherein generating the optical flow map further comprises:
   thresholding the optical flow depth estimates so that the optical flow map only includes the second image pixels estimated to fall within a threshold distance to the stereovision camera system.

9. The method of claim 7, further comprising:
   generating or updating the optical flow map when the aircraft is determined to be flying in a straight path without yaw, roll, or pitch motions.

10. The method of claim 7, wherein the one or more onboard sensors of the aircraft includes a rotational motion sensor and wherein determining the flow velocities comprises:
    offsetting rotational components in the flow velocities based upon an angular velocity measured by the rotational motion sensor while the video stream is captured.

11. The method of claim 1, further comprising:
    buffering the video stream while the aircraft is flying;
    saving a temporal window of the video stream to onboard memory of the aircraft for subsequent processing, the temporal window surrounding assertion of the encounter flag.

12. The method of claim 11, wherein the aircraft comprises an unmanned aerial vehicle (UAV), the method further comprising:
    after landing the UAV on a charging pad upon returning from an aerial mission, either:
      uploading a mission log including the temporal window of the video stream to a backend management system for three-dimensional (3D) model reconstruction; or
      analyzing the temporal window of the video stream with an onboard processing system of the UAV for 3D model reconstruction and providing 3D model updates to the backend management system.

13. The method of claim 11, wherein the aircraft comprises an unmanned aerial vehicle (UAV), the method further comprising:
    wirelessly informing a backend management system of the close encounter; and
    establishing a geofence restriction zone around a location of the close encounter.

14. The method of claim 1, further comprising:
    semantically segmenting the video stream to identify objects within the video stream; and selectively masking the encounter flag based on the semantic segmentation of the video stream.

15. At least one non-transitory machine-readable storage medium storing instructions that, when executed by a processing system of an unmanned aerial vehicle (UAV) will cause the UAV to perform operations comprising:
acquiring a video stream of a ground area below the UAV with a camera system;
monitoring a flight motion of the UAV using an onboard motion sensor while acquiring the video stream;
determining flow velocities of first image pixels from the video stream by comparing pixel motions of the first image pixels between consecutive image frames in the video stream with an optical flow processing pipeline;
calculating optical flow depth estimates for the first image pixels based on both the flow velocities and the flight motion of the UAV; and
asserting an encounter flag indicting that a close encounter between the UAV and an obstacle rising from the ground area occurred based at least on the optical flow depth estimates.

16. The at least one non-transitory machine-readable storage medium of claim 15, wherein the video stream comprises a stereovision video stream and wherein the operations further comprise:
generating a depth perception map indicating stereovision depth estimates of second image pixels from the stereovision video stream with a stereovision processing pipeline;
generating an optical flow map based on the optical flow depth estimates for the first image pixels; and
comparing the depth perception and optical flow maps, wherein the encounter flag is asserted based at least on the comparing.

17. The at least one non-transitory machine-readable storage medium of claim 15, wherein the operations further comprise:
generating an optical flow map indicating the optical flow depth estimates of the first image pixels; and
analyzing the optical flow map with the optical flow processing pipeline, wherein the encounter flag is asserted based at least on the analysis of the optical flow map.

18. The at least one non-transitory machine-readable storage medium of claim 17, wherein analyzing the optical flow map includes:
performing a morphological analysis on a contiguous pixel group in the optical flow map;
thresholding a size of the contiguous pixel group; and
temporally thresholding a persistence of the contiguous pixel group.

19. The at least one non-transitory machine-readable storage medium of claim 15, wherein calculating the optical flow depth estimates for the first image pixels from the video stream comprises:
updating the optical flow depth estimates when the flight motion is determined to be a straight path without yaw, roll, or pitch motions; or
offsetting rotational components in the flow velocities based upon an angular velocity measured by the onboard motion sensor while the video stream is captured.

20. At least one non-transitory machine-readable storage medium storing instructions that, when executed by a processing system of an unmanned aerial vehicle (UAV), will cause the UAV to perform operations comprising:
acquiring a video stream of a ground area below the UAV with a stereovision camera system disposed onboard the UAV;
generating a depth perception map indicating stereovision depth estimates of first image pixels from the video stream with a stereovision processing pipeline;
generating an optical flow map indicating optical flow depth estimates of second image pixels from the video stream with an optical flow processing pipeline;
comparing the depth perception and optical flow maps; and
asserting an encounter flag indicting that a close encounter between the UAV and an obstacle occurred based at least on the comparing.

* * * * *

UNITED STATES PATENT AND TRADEMARK OFFICE
CERTIFICATE OF CORRECTION

PATENT NO. : 12,400,350 B2
APPLICATION NO. : 17/990193
DATED : August 26, 2025
INVENTOR(S) : Ali Shoeb et al.

Page 1 of 1

It is certified that error appears in the above-identified patent and that said Letters Patent is hereby corrected as shown below:

In the Claims

| Column | Line | |
|---|---|---|
| 11 | 35 | Claim 1, delete "flag indicting" and insert -- flag indicating -- |
| 11 | 57 | Claim 5, delete "flag indicting" and insert -- flag indicating -- |
| 13 | 18 | Claim 15, delete "flag indicting" and insert -- flag indicating -- |
| 14 | 38 | Claim 20, delete "flag indicting" and insert -- flag indicating -- |

Signed and Sealed this
Eighteenth Day of November, 2025

John A. Squires
*Director of the United States Patent and Trademark Office*